United States Patent [19]

Matsuhisa

[11] Patent Number: 5,335,004
[45] Date of Patent: Aug. 2, 1994

[54] ACTIVE ENERGY-RAY-CURABLE RESIN COMPOSITION, INK JET HEAD HAVING INK PATH WALL FORMED BY USE OF THE COMPOSITION, PROCESS FOR PREPARING THE HEAD, AND INK JET APPARATUS PROVIDED WITH THE HEAD

[75] Inventor: Hirohide Matsuhisa, Yokohama, Japan

[73] Assignee: Canon Kabushiki Kaisha, Tokyo, Japan

[21] Appl. No.: 850,211

[22] Filed: Mar. 12, 1992

Related U.S. Application Data

[62] Division of Ser. No. 627,492, Dec. 14, 1990, abandoned.

[30] Foreign Application Priority Data

Dec. 15, 1989 [JP] Japan ................... 1-325453

[51] Int. Cl.$^5$ ................... C08F 2/50; C08G 59/22; C08G 59/18
[52] U.S. Cl. ................... 347/44; 522/31; 522/170
[58] Field of Search ................... 522/31, 102, 170; 346/140 R

[56] References Cited

U.S. PATENT DOCUMENTS

| | | | |
|---|---|---|---|
| 3,981,897 | 9/1976 | Crivello | 260/440 |
| 4,313,124 | 1/1982 | Hara | 346/140 R |
| 4,345,262 | 8/1982 | Shirato et al. | 346/140 R |
| 4,371,605 | 2/1983 | Renner | 430/280 |
| 4,421,904 | 12/1983 | Eckberg et al. | 522/31 |
| 4,459,600 | 7/1984 | Sato et al. | 346/140 R |
| 4,463,359 | 7/1984 | Ayata et al. | 346/1.1 |
| 4,504,372 | 3/1985 | Kirchmayr et al. | 204/159.15 |
| 4,558,333 | 12/1985 | Sugitani et al. | 346/140 R |
| 4,688,053 | 8/1987 | Noguchi et al. | 346/140 R |
| 4,688,056 | 8/1987 | Noguchi et al. | 522/102 |
| 4,723,129 | 2/1988 | Endo et al. | 346/1.1 |
| 4,740,796 | 4/1988 | Endo et al. | 346/1.1 |
| 5,030,317 | 7/1991 | Noguchi | 156/630 |

FOREIGN PATENT DOCUMENTS

| | | |
|---|---|---|
| 0089922 | 3/1984 | European Pat. Off. . |
| 58348 | 10/1967 | Fed. Rep. of Germany . |
| 3623776 | 1/1987 | Fed. Rep. of Germany . |
| 2582005 | 11/1986 | France . |
| 54-56847 | 5/1979 | Japan . |
| 108450 | 8/1980 | Japan . |
| 59-123670 | 7/1984 | Japan . |
| 59-138461 | 8/1984 | Japan . |
| 60-71260 | 4/1985 | Japan . |
| 61-154947 | 7/1986 | Japan . |
| 62-253457 | 11/1987 | Japan . |
| 113022 | 4/1990 | Japan . |
| 151611 | 7/1978 | United Kingdom . |
| 1516512 | 7/1978 | United Kingdom . |
| A2177093 | 1/1987 | United Kingdom . |

OTHER PUBLICATIONS

Crivello et al., "J. Polym. Sci. Polym. Chem. Ed.", vol. 17, No. 9. pp. 2877–2892 (1979).
Schlesinger, "Polym. Eng. Sci.", vol. 14, pp. 513–515 (1974).
Hayase et al., "J. Polym. Sci. Polym. Chem. Ed.", vol. 19, No. 9, pp. 2185–2914 (1981).
Meier et al., "J. of Radiation Curing", vol. 13, No. 4, pp. 26–32 (1986).

Primary Examiner—Susan Berman
Attorney, Agent, or Firm—Fitzpatrick, Cella, Harper & Scinto

[57] ABSTRACT

An active energy-ray-curable resin composition of a cation-polymerizable type for forming a wall of flow path of an ink jet head comprises 50 to 98.5% by weight of an aromatic epoxy resin having a molecular weight of not less than 300, 1 to 10% by weight of a silane coupling agent, and 0.5 to 5% by weight of an active catalyst.

9 Claims, 4 Drawing Sheets

ACTIVE ENERGY-RAY-CURABLE RESIN COMPOSITION, INK JET HEAD HAVING INK PATH WALL FORMED BY USE OF THE COMPOSITION, PROCESS FOR PREPARING THE HEAD, AND INK JET APPARATUS PROVIDED WITH THE HEAD

This application is a division of application Ser. No. 07/627,492 filed Dec. 14, 1990, now abandoned.

BACKGROUND OF THE INVENTION

1. Field of the Invention

The present invention relates to a resin composition curable by an active energy-ray for use for forming a wall of an ink path of an ink jet head. The present invention also relates to an ink jet head having a wall of ink path formed by use of the resin composition, a process for preparing the head, and an ink jet apparatus provided with the head.

2. Related Background Art

Conventionally, ink jet heads for ink jet recording systems are produced by forming fine grooves on a substrate made of a metal, a metal oxide, or the like by fabrication means such as cutting, etching, and the like and subsequently bonding the substrate to another substrate to form a flow path.

Such a conventional process involves disadvantages that it cannot give a narrower flow path with high precision to satisfy sufficiently the requirement resulting from the recent increase of recording density, and that the alignment between the grooves for forming flow paths, and piezoelectric elements or electrothermal transducers for generating energy to be utilized for ejecting ink is difficult, resulting in low production yields. To solve such problems, Japanese Laid-Open Patent Application Nos. 61-154947, and 62-253457 disclose processes for producing ink jet heads. An example of processes for producing an ink jet head is briefly described by referring to figures.

Figures 1, 2, 5:
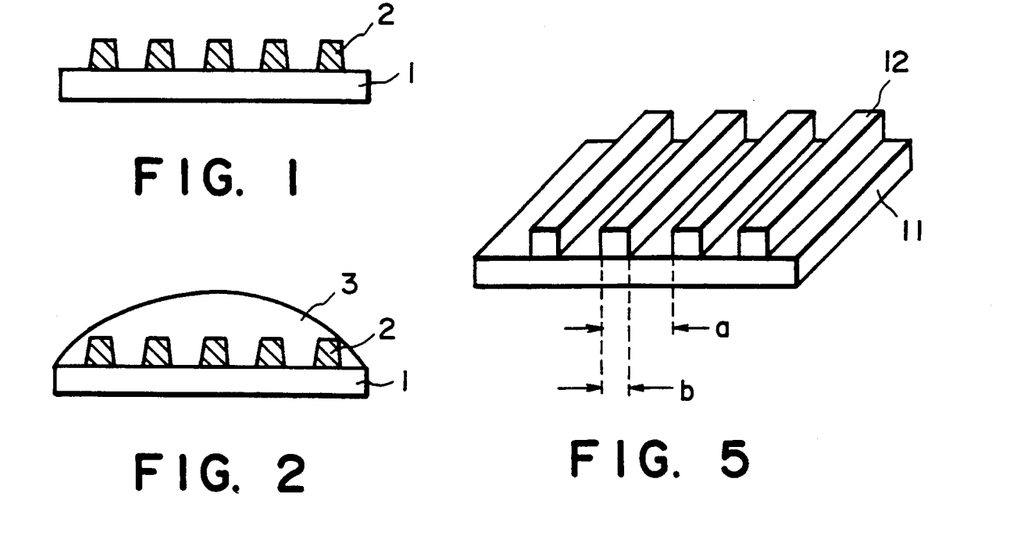
FIGS. 1 to 4 are schematic cross-sectional views illustrating the process for forming ink jet flow paths by use of the composition of the present invention.
FIG. 5 is an oblique view of a pattern prepared in Example 1.

Firstly, as shown in FIG. 1, a positive type dry film or the like is laminated on a base plate 1, and is subjected to patterning treatment to form a solid layer 2 on the position where the nozzles are to be formed.

Then, as shown in FIG. 2, a curable resin composition 3 is applied on the base plate 1 by potting.

Figure 3:
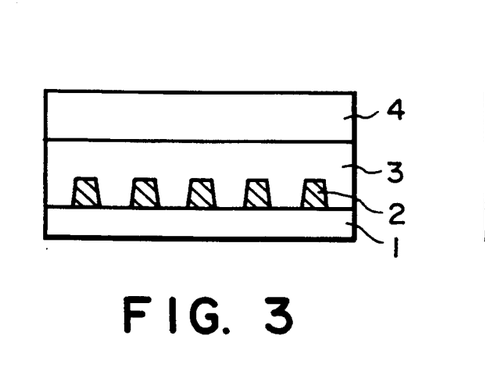

Subsequently as shown in FIG. 3, another substrate 4 is contact-bonded, and the curable resin is cured.

Figure 4:
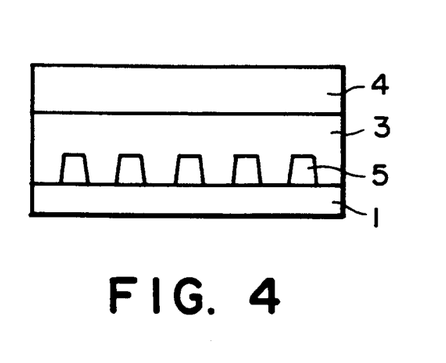

Next, as shown in FIG. 4, the solid layer 2 only is dissolved off by using an aqueous alkali solution, thereby completing ink flow paths.

In such processes, the solid layer 2 is generally formed from a positive type photosensitive material because of ease of removal and simplicity of patterning. The curable resin composition 3 is prepared from an active energy-ray curable resin rather than from a thermosetting resin because of ease of forming various fine patterns in addition to the flow path pattern by merely using a mask.

The processes described above still have disadvantages that the flow path pattern cannot readily be formed with high precision and high density, so that further improvement is desired.

A disadvantage to be offset, for example, is that the solid layer 2 may come to be dissolved or swollen by the resin composition 3 laminated thereon because the solid layer 2 is made of a positive type photosensitive material which is a special material having relatively high solubility and swelling characteristics. Sometimes in a finished ink jet head, the conventional resin compound 3 exerts a strong interaction with a liquid ink, so that the problem remains of deformation of the flow path caused by swelling of the flow path forming material. Furthermore, the conventional resin composition 3 may have insufficient adhesion force for bonding to various surface to be bonded (e.g. $SiO_2$, polyimide, glass, etc.), where exfoliation or separation of the resin composition may occur.

SUMMARY OF THE INVENTION

The present invention is to provide an active energy-ray-curable resin composition highly useful for formation of an ink jet flow path wall, which has substantially no compatibility to a molding material and the like employed in formation of an ink jet flow path and is substantially not swollen by such materials, being capable of forming ink jet flow path with high precision and high density, having little interaction with an liquid ink, being excellent in chemical resistance, and being not readily exfoliated, The present invention is also to provide an ink jet head having a wall of an ink path formed by use of the above-mentioned resin composition, a process for preparing the ink jet head, and an ink jet apparatus provided with the ink jet head.

According to an aspect of the present invention, there is provided an active energy-ray-curable resin composition of a cation-polymerizable type for forming a wall of a flow path of an ink jet head, comprising (a) 50 to 98.5% by weight of an aromatic epoxy resin having a molecular weight of not less than 300, (b) 1 to 10% by weight of a silane coupling agent, and (c) 0.5 to 5% by weight of an active catalyst (where the active energy-ray-curable resin composition of a cation-polymerizable type substantially means those compositions which contain an active catalyst which releases a Lewis acid or a Br nsted acid on exposure to active energy-ray radiation to initiate polymerization of the cationic polymerizable resin composition).

According to another aspect of the present invention, there is provided an ink jet head, having a path communicating with an ejection opening for ejecting ink, the wall of the path being formed of an active energy-ray-curable resin composition of a cation-polymerizable type for comprising 50 to 98.5% by weight of an aromatic epoxy resin having a molecular weight of not less than 300, 1 to 10% by weight of a silane coupling agent, and 0.5 to 5% by weight of an active catalyst.

According to still another aspect of the present invention, there is provided an ink jet apparatus, which comprises an ink jet head, having a path communicating with an ejection opening for ejecting ink, the wall of the path being formed of an active energy-ray-curable resin composition of a cation-polymerizable type comprising 50 to 98.5% by weight of an aromatic epoxy resin having a molecular weight of not less than 300, 1 to 10% by weight of a silane coupling agent, and 0.5 to 5% by weight of an active catalyst; and a power source switch.

According to a further aspect of the present invention, there is provided a process for preparing an ink jet head, comprising the steps of: forming a solid layer at a position for forming a path communicating with an ejection opening for ejecting ink on a substrate provided with an energy generating member for generating energy to be utilized for ejecting ink from the ejection opening so as to correspond to the path; providing, at another position on the substrate where the solid layer is not formed, an active energy-ray-curable resin composition of a cation-polymerizable type comprising 50 to 98.5% by weight of an aromatic epoxy resin having a molecular weight of not less than 300, 1 to 10% by weight of a silane coupling agent, and 0.5 to 5% by weight of an active catalyst; curing the active energy-ray-curable resin composition by exposure to an active energy-ray; and removing the solid layer to form the flow path.

BRIEF DESCRIPTION OF THE DRAWINGS

FIGS. 8 to 13 show schematically the steps of a basic embodiment of the process for producing an ink jet head of the present invention.

DESCRIPTION OF THE PREFERRED EMBODIMENT

The active energy-ray-curable resin composition of the present invention is described below in detail.

(a) Aromatic epoxy resin

The aromatic epoxy resin (a) used in the present invention has preferably two or more epoxy groups in the molecule in order to increase crosslinking density. An aromatic epoxy resin of a low molecular weight such as phenyl glycidyl ether and the like, which has a low viscosity and is highly compatible with positive type dry films, will not give a sufficiently highly precise flow path pattern. Accordingly the aromatic epoxy resin employed in the present invention should have a molecular weight of not less than 300. Further, an epoxy resin having a nitrogen atom in molecule, in a form of amine, amide, nitrile and the like, may sometimes inhibit cure owing to nucleophilicity of their functional groups. Accordingly, use of a multi-functional epoxy resin having no nitrogen is desirable. Preferable epoxy resins (a) to be employed are those having a bisphenol A skeleton, a bisphenol F skeleton, a bisphenol S skeleton, a phenol-novolak skeleton, cresol-novolak skeleton, an the like skeleton. The specific examples include epoxy resins shown below.

The active energy-ray-curable resin composition of the present invention may contain as a constituent another cation-polymerizable compound such as an epoxy type resin other than the above-mentioned epoxy resin (a), a vinyl ether, a cyclic ether, a vinyl compound, and the like. Among them, an epoxy type resin is preferred in view of mutual compatibility of the resin compositions with each other, reactivity, resistance to ink, and other properties. As mentioned before, desirably, those having nucleophilicity is not to be used because of possible inhibition of curing.

The optionally employed epoxy resin other than the epoxy resin (a) includes polybasic polyglycidyl ethers having an aliphatic long chain, and polyglycidyl ethers derived by addition of alkylene oxide to polyhydric alcohols for imparting flexibility; alicylcic epoxy compounds for raising the sensitivity to active energy ray; monoglycidyl ethers of an alcohol as a reactive diluent; and the like. Specific examples of the epoxy type resin for imparting flexibility include polyethylene glycol diglycidyl ether, polypropylene diglycidyl ether, 1,4-butanediol diglycidyl ether, 1,6-hexanediol diglycidyl ether, polyglycerin polyglycidyl ether, a glycidyl ether prepared by reacting bisphenol A or an alkylene oxide adduct thereof with epichlorohydrin, and the like. Specific examples of the epoxy type resins for raising the sensitivity include 3,4-epoxycyclohexylmethyl-3,4-epoxycyclohexyl carboxylate, vinyl cyclohexene dioxide, 1,2-epoxy-4-vinylcyclohexane, and the like. Specific examples for the reactive diluents include phenoxy glycidyl ether, dodecyl glycidyl ether, butyl glycidyl ether, and the like.

The aforementioned epoxy type resins other than the epoxy resin (a) mostly have high compatibility with a positive type dry film used as the pattern material, and frequently decrease the crosslinking density of the cured matter or decrease the resistance to recording liquid, so that the content thereof is preferably adjusted to be low. Accordingly, the epoxy resin (a) is used in an amount of from 50 to 98.5% by weight, preferably from 65 to 90% by weight in the active energy-ray-curable resin composition. With the amount exceeding 98.5% by weight, the cured matter is hard and has low adhesiveness, while with the amount below 50% by weight, the resistance to ink may be low or the compatibility with the positive type dry film as pattern material is high, which may prevent construction of a highly reliable and highly precise head.

(b) Silane coupling agent

The silane coupling agent (b) used in the present invention is added for securing sure bonding strength at special complicated interfaces of an ink jet head, especially for increasing the bonding strength to an inorganic interface. However, silane coupling agents are mostly of low molecular weights and of medium polarity, tending to have high compatibility with the positive type photosensitive resin employed as the pattern material. Therefore, the agent should be used in an amount of from 1 to 10% order to form an ink flow path pattern with sufficiently high precision. With the amount below 1% by weight, the bonding strength is not improved, while with the amount exceeding 10% by weight, the precision of the ink flow path pattern becomes low. Since functional groups having a high nucleophilicity (e.g., an amino group, a thiol group, etc.) will hinder the cure, the silane coupling agent (b) is also desired to have a group of a low nucleophilicity such as epoxy, methacryl, acryl, vinyl, and the like. More particularly, epoxyalkoxysilane having the same functional groups is most desirable, since the system, containing an epoxy resin as a main constituent, is cured by ring-opening polymerization of the epoxy resin. Specifically, the compounds below are mentioned.

(c) Active catalyst

The active catalyst (c) (a photosensitized cationic polymerization initiator: hereinafter referred to as photo-cationic initiator) is desirably in a form of a salt or a higher ester. Usually the catalyst is preferably used as a solution in a polar solvent since some of the catalysts are less compatible with the epoxy resin and are less stable. The polar solvent tends to readily swell or dissolve a positive type dry film employed as the pattern material, so that the active catalyst (c) is used in a minimum amount for initiating the curing reaction by the active energy-ray to be effective. Accordingly, the amount of the active catalyst (c) to be used is in the range of from 0.5 to 5% by weight.

As the active catalyst (c), various known compounds conventionally used in this technical field are useful. Any compound may be used which releases a Lewis acid or a Brønsted acid on irradiation of an active energy ray. For example, aryldiazonium salts ($Ar-N_2^+.X^-$) are disclosed by S. I. Schlesinger et al. in Polym. Eng. Sci. 14, 513 (1954); diaryl iodonium salts ($Ar_2I^+.X^-$) are disclosed in U.S. Pat. No. 3,981,895 (1976); triaryl sulfonium salts ($Ar_3S^+.X^-$) are disclosed in Belgian Patent 828,650 (1974); dialkyl phenacyl sulfonium salts and dialkyl-4-hydroxyphenyl sulfonium salts are disclosed by J. V. Crivello et al. in J. Polym. Sci. Polym. Chem. Ed. 17, 2875 (1979); a certain kind of sulfonate esters are disclosed in U.S. Pat. No. 4,371,605 (1980) and EP 89,922 (1982); Fe-arene compounds are disclosed by K. Meier in J. Radiat. Curing 13 (4), 26 (1986); and silanol-aluminum complexes are disclosed by S. Hayase et al. in J. Poylm. Sci. Polym. Chem. Ed. 19, 2185 (1981).

Specifically the compounds below are mentioned.

-continued

The compounds below are particularly preferred in view of the stability, sensitivity, solubility in polar solvents, safety, and so forth of the active catalyst (c).

The active energy-ray-curable resin composition is required to have a suitable viscosity from the standpoint of workability. The static viscosity is preferably in the range of from 1,000 to 100,000 cps, more preferably from 3,000 to 7,000 cps at 25° C. With a composition having a relatively high viscosity, the disadvantage of poor workability can be offset by raising the temperature to reduce the viscosity. However, heating to 60° C. or higher may cause deformation of the flow path pattern owing to the heat resistance of the positive type dry film as the pattern material. On the other hand, with a composition having a low viscosity, the active energy-ray-curable resin composition may flow out from the end of the flow path to cause deformation of the flow path pattern.

In the active energy-ray-curable resin composition of the present invention, the satisfactory properties of the respective components mentioned above exhibit a synergistic effect, thereby giving a curable resin composition extremely suitable for formation of flow paths of ink jet heads. The composition can be used referring to FIGS. 1 to 4 according to a conventional method as illustrated before.

The present invention will be described in more detail below.

EXAMPLE 1

| | |
|---|---|
| Bisphenol A high-purity epoxy resin[1] | 93.5% by weight |
| Epoxy silane coupling agent[2] | 4.5% by weight |
| Aromatic sulfonium salt photo-cationic polymeriation initiator[3] | 2.0% by weight |

[1] Adeka Resin EP4100E; Asahi Denka K.K.
[2] A-187; Nippon Unicar K.K.
[3] Adeka Optomer SP-170; Asahi Denka K.K.

The active energy-ray-curable resin composition having the formulation above was prepared under safelight. The resulting composition had a viscosity of 4,800 cps at 25° C.

For the purpose of evaluating the compatibility and swelling property with the positive type dry film, Ozatech R-225, a positive type dry film made by Hoechst Co., was applied on a substrate of 7059 made by Corning Co. under safelight to make a pattern in 63.5 μm pitch to give 25 μm breadth of unexposed portion as shown in FIG. 5. In FIG. 5, a=63.5 μm and B=25 μm. On this pattern, an extremely small amount of the resin composition prepared above of the present invention was applied by potting, and the time having elapsed before the pattern shape became unobservable by microscope was measured. With the resin composition of this Example, the pattern shape did not change after 48 hours. In order to evaluate the swelling by ink, a cured sample piece of 50 mm in diameter was prepared by exposing this resin composition to light energy at a rate of 6 J/cm$^2$ (at 365 nm) at room temperature with a extra-high-pressure mercury lamp, and then heating at 130° C. for 30 minutes. The sample piece was left immersed in an ink (pure water/diethyleneglycol/Direct Black 154=65/30/5 (parts by weight)) at 80° C. for one week in a sealed container. The volume change during the immersion was +0.3%

EXAMPLE 2

| | |
|---|---|
| Phenol-novolak epoxy resin[4] | 70% by weight |
| Flexible epoxy resin[5] | 24% by weight |
| Epoxy silane coupling agent[6] | 5% by weight |
| Aromatic sulfonium salt photo-cationic | 1% by weight | polymerization initiator[7)]

[4)]Epicoat 152; Yuka Shell K.K.
[5)]Prakcell GL-62; Daisel K.K.
[6)]SH-6040; Toray Silicone K.K.
[7)]Adeka Optomer SP-170; Asahi Denka K.K.

Patterning and evaluation were conducted in the same manner as in Example 1 except that the above formulation was employed.

EXAMPLE 3

| | |
|---|---|
| Bisphenol A high-purity epoxy resin[8)] | 65% by weight |
| Flexible epoxy resin[9)] | 28.5% by weight |
| Epoxy silane coupling agent[10)] | 5% by weight |
| Aromatic sulfonium salt photo-cationic polymeriation initiator[11)] | 1.5% by weight |

[8)]EP4100E; Asahi Denka K.K.
[9)]Epolite 3002; Kyoei Yushi K.K.
[10)]A-187; Nippon Unicar K.K.
[11)]Adeka Optomer SP-170; Asahi Denka K.K.

Patterning and evaluation were conducted in the same manner as in Example 1 except that the above formulation was employed.

EXAMPLE 4

| | |
|---|---|
| Bisphenol A high-purity epoxy resin[12)] | 60% by weight |
| Phenol-novolak epoxy resin[13)] | 27% by weight |
| Flexible epoxy resin[14)] | 5.75% by weight |
| Epoxy silane coupling agent[15)] | 3% by weight |
| Iron-arene photo-cationic polymerization initiator[16)] | 2% by weight |
| Oxidizing agent[17)] | 2% by weight |
| Sensitizing dye[18)] | 0.25% by weight |

[12)]EP4100E; Asahi Denka K.K.
[13)]Epicoat 154; Yuka Shell K.K.
[14)]Araldite CY-221; Nippon Ciba-Geigy K.K.
[15)]TSL-8350; Toshiba Silicone K.K.
[16)]Irgacure 261; Ciba Geigy Co.
[17)]Cumene hydroperoxide
[18)]Anthracene Patterning and evaluation were conducted in the same manner as in Example 1 except that the above formulation was employed.

EXAMPLE 5

| | |
|---|---|
| Bisphenol F epoxy resin[19)] | 50% by weight |
| Bisphenol A epoxy resin[20)] | 45% by weight |
| Epoxy silane coupling agent[21)] | 2.5% by weight |
| Aromatic sulfonium salt photo-cationic polymerization initiator[22)] | 2.5% by weight |

[19)]Cyracure UVR-6490; Union Carbide Co.
[20)]Cyracure UVR-6410; Union Carbide Co.
[21)]KBM-303, made by Shin-Etsu Chemical Co., Ltd.
[22)]Cyracure UVR-6970; Union Carbide Co.

Patterning and evaluation were conducted in the same manner as in Example 1 except that the above formulation was employed.

COMPARATIVE EXAMPLE 1

| | |
|---|---|
| Bisphenol A epoxy resin[23)] | 40% by weight |
| Alicyclic epoxy resin[24)] | 30% by weight |
| Flexibility-imparting agent[25)] | 22% by weight |
| Epoxy silane coupling agent[26)] | 5% by weight |
| Aromatic sulfonium salt photo-cationic polymerization initiator[27)] | 3% by weight |

[23)]EP4100E; Asahi Denka K.K.
[24)]Cyracure UVR-6110; Union Carbide Co.
[25)]Cyracure UVR-6351; Union Carbide Co.
[26)]A-187; Nippon Unicar K.K.
[27)]Cyracure UVR-6970; Union Carbide Co.

Patterning and evaluation were conducted in the same manner as in Example 1 except that the above formulation was employed.

COMPARATIVE EXAMPLE 2

| | |
|---|---|
| Alicyclic solid epoxy resin[28)] | 46% by weight |
| Alicyclic epoxy resin[29)] | 46% by weight |
| Thiol silane coupling agent[30)] | 5% by weight |
| Aromatic sulfonium salt photo-cationic polymerization initiator[31)] | 3% by weight |

[28)]EHPE3150; Daicel K.K.
[29)]Celloxide 2021; Daicel K.K.
[30)]SH-6062; Toray Silicone K.K.
[31)]Adeka Optomer SP-170; Asahi Denka K.K.

Patterning and evaluation were conducted in the same manner as in Example 1 except that the above formulation was employed.

COMPARATIVE EXAMPLE 3

| | |
|---|---|
| Epoxidized polybutadiene resin[32)] | 60% by weight |
| Alicyclic epoxy resin[33)] | 20% by weight |
| Flexibility-imparting agent[34)] | 18% by weight |
| Aromatic sulfonium salt photo-cationic polymerization initiator[35)] | 2% by weight |

[32)]BF-1000; Adeka Argus K.K.
[33)]Celloxide 2021; Daicel K.K.
[34)]Adekacizer O-130P; Adeka Argus K.K.
[35)]Cyracure UVR-6970; Union Carbide Co.

Patterning and evaluation were conducted in the same manner as in Example 1 except that the above formulation was employed.

Evaluation

Table 1 shows the results of the evaluation of the samples of the active energy-ray-curable resin composition described in Examples and Comparative examples. The static viscosity at 25° C. was measured by a B-type viscometer manufactured by Shibaura System K.K. The gelation sensitivity is represented by the quantity of energy required for curing the third step when the composition is applied by an applicator in a thickness of 4 mil, Tedlet ® film of 25 μm thick (made by DuPont Co.) is made to adhere thereto, and the samples are exposed to light from a high-pressure mercury lamp (500 W) through step tablet BK-2 (made by Kodak Co.). The bonding strength was evaluated as follows. The composition was applied in a thickness of 4 mil respectively on a glass substrate ("7059" made by Corning Co.), a glass substrate coated with polyimide film (Photoneenu ® UR-3100 made by Toray K.K.), and a glass substrate coated with a sputtered SiO₂ film. Thereafter, the aforementioned exposure for gelation sensitivity test was conducted. Further post-cure was conducted at 130° C. for 30 minutes to complete the curing. Each specimen was scratched in crosses like on a checker board and was subjected to tape-peeling test (by using a tape P810 manufactured by Scotch Co.). The symbol ○ denotes that no peeling occurred; the symbol Δ denotes that peeling occurred at a rate of from 1/16 to 4/16; and the symbol × denotes that peeling occurred at a rate of 5/16 or more.

TABLE 1

|  | Viscosity [cps] | Gellation sensitivity [mJ/cm$^2$] | Pattern shape deformation Time (Hrs.) | Ink resistance (Volume change) (%) | Glass bonding | Polyimide bonding | SiO$_2$ bonding |
| --- | --- | --- | --- | --- | --- | --- | --- |
| Example |  |  |  |  |  |  |  |
| 1 | 4800 | 6000 | 48 ~ | 0.3 | ○ | ○ | ○ |
| 2 | 7000 | 5500 | 48 ~ | 0.4 | ○ | ○ | ○ |
| 3 | 3300 | 6000 | 48 ~ | 0.5 | ○ | ○ | ○ |
| 4 | 5500 | 7000 | 48 ~ | 0.4 | ○ | ○ | ○ |
| 5 | 4000 | 6000 | 48 ~ | 0.5 | ○ | ○ | ○ |
| Comparative example |  |  |  |  |  |  |  |
| 1 | 2000 | 5000 | 24 | 1.5 | ○ | ○ | ○ |
| 2 | 5000 | Curing inhibited | 12 | — | — | — | — |
| 3 | 6100 | 8000 | 18 | 2 | △ | ○ | △ |

As understood from Table 1, the active energy-ray-curable resin composition of the present invention has satisfactory pattern-retaining property, Giving readily high precision and high density of the flow path pattern in ink jet flow path formation; having high resistance to ink, causing very little deformation of the flow path pattern in long term of use, and giving stable ejection performance; and further has high bonding strength at various interfaces, allowing production of reliable ink jet heads without causing peeling.

The main component of the composition of the present invention contains an aromatic skeleton and is multifunctional, which gives satisfactory performance such as resistance to heat and chemicals. Owing to such characteristics, the composition can be produced under broad process conditions with high productivity.

Figure 6:
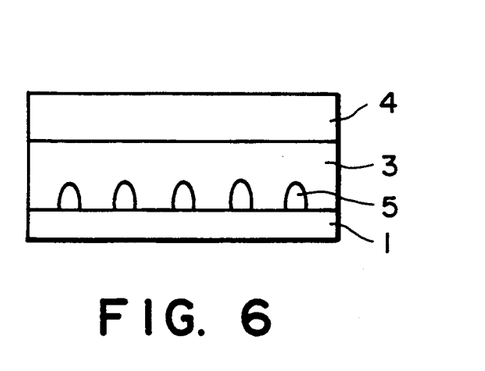
FIG. 6 is a cross-sectional view of an orifice portion of an ink jet head formed by use of the composition of Comparative example 1.
Figure 7:
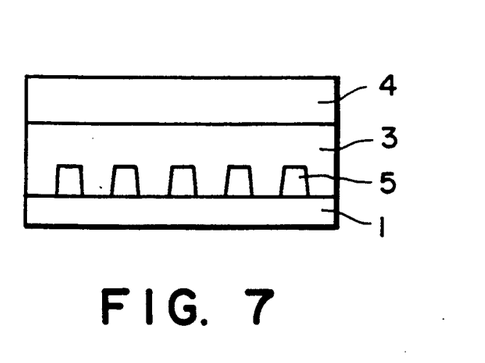
FIG. 7 is a cross-sectional view of an orifice portion of an ink jet head formed by use of the composition of Example 3.

FIG. 6 and FIG. 7 illustrate schematic cross-sectional views from orifice side of the ink jet heads produced from the compositions of Comparative example 1 and Example 3, respectively. (Hereinafter the orifice is also called as an "ejection opening".) The flow path and the orifice 5 of the ink jet head prepared in Comparative example 1 change remarkably in shape owing to swelling or dissolution of the positive type dry film which had been filled as the pattern material in these portions. On the contrary, the one prepared in Example 3 is satisfactory in dimensional precision and exhibits excellent shape-transferability, which shows that the active energy-ray-curable resin composition of the present invention is an excellent material for formation of an ink jet flow path.

FIG. 8–FIG. 13 are a schematic process view for illustrating a fundamental embodiment of the process for preparing an ink jet head (hereinafter also referred to as "liquid jet head") present invention. An example of the constitution of the liquid jet recording head produced by the method of the present invention and the procedure for production thereof is shown in FIG. 8–FIG. 13. In this example, the liquid jet recording head having two orifices is shown. However, the liquid jet recording head of the present invention includes the high density multi-orifice liquid jet recording head having the orifices over two and the liquid jet recording head having one orifice. Further, shown in this example is the process for producing the liquid jet recording head having the orifice for discharging a liquid toward the direction similar to that of the liquid flow. However, the present invention is not limited thereto and includes, for example, a process for producing a liquid jet recording head having an orifice for discharging a liquid toward the direction perpendicular to that of the liquid flow.

Figure 8:
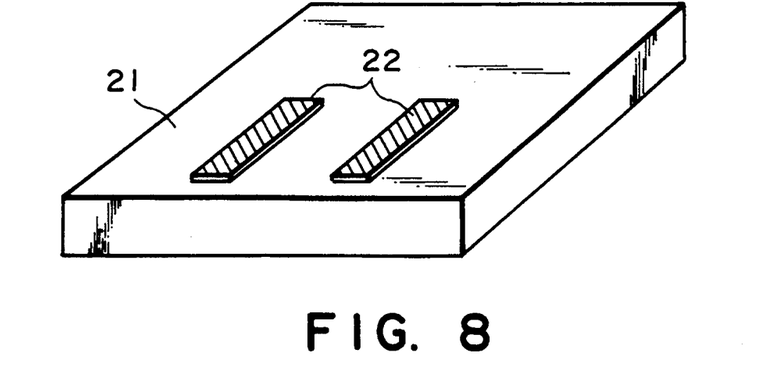
FIG. 8 is a schematic oblique view of a substrate prior to formation of a solid layer.

In this embodiment, a base plate 21 (hereinafter, also referred to as "substrate") composed of, for example, a glass, ceramic or metal, etc. as shown in FIG. 8 is used. FIG. 1 is a schematic oblique view of a substrate before formation of a solid layer.

Such a base plate 21 can be used without being limited in the shape, the quality of the material the like in the case where base plate 21 acts as a part of the liquid flow path-constituting member acts as a support for forming a solid layer and liquid flow path wall as described hereinafter. A desired number (two in FIG. 8) of energy generating elements 22 for generating energy to be utilized for discharging liquid such as, e.g., an electro-thermal transducer or a piezoelectric element are arranged on the base plate 21. Energy to be utilized for discharging recording liquid as small droplet is supplied to the ink liquid by such an energy generating member 22. For example, in the case where an electro-thermal transducer is used as the energy generating element 22, the recording liquid in the vicinity of the element 22 is heated by the element to discharge ink. In the case where the piezoelectric element is used as the energy generating element, ink is discharged by the mechanical vibration of the element.

Electrodes for inputting a controlling signal (not shown in the figure) is connected to the elements 22 to operate the elements. In general, a functional layer such as a protecting layer and the like is provided with the object of improving the durability of the energy generating elements. In the present invention, of course, such a functional layer may be provided. In this embodiment, the energy generating elements are provided on the base member before formation of the liquid flow path. However, the elements may be provided on the substrate at any time.

Figure 9A:
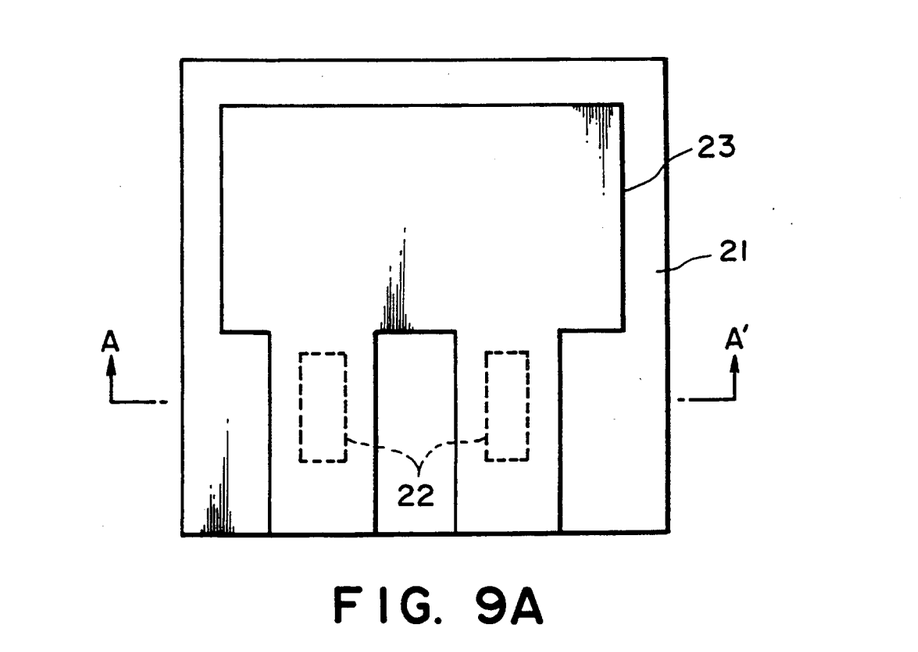
FIG. 9A is a schematic plan view after formation of a solid layer.
Figure 9B:
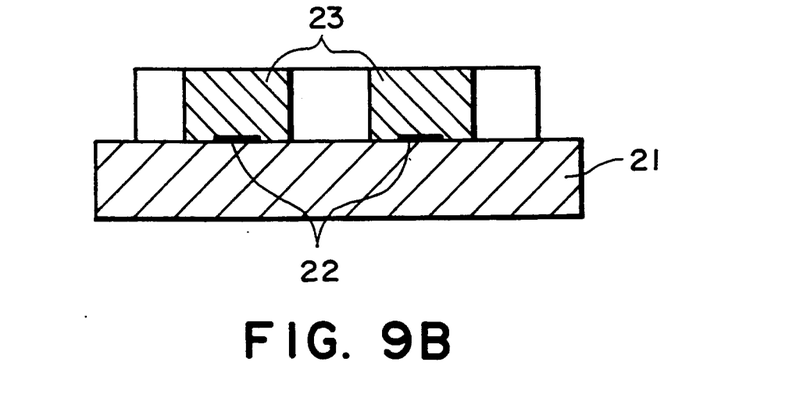
FIG. 9B is a schematic cross-sectional view from the line A—A' in FIG. 9A.

Next, a solid layer 23 is formed on the portion predetermined for forming the liquid flow path, on which the energy generating elements 22 are previously provided, on the substrate as shown FIG. 9A and FIG. 9B. FIG. 9A is a schematic plan view after formation of the solid layer. FIG. 9B is a cross-sectional view taken along a dot and dash line A—A' in FIG. 9A.

The solid layer 23 is removed from the substrate 21, after a material for forming the liquid flow path well is laminated as described hereinafter, to form the liquid flow path. Of course, it is possible to form the liquid flow path in a desired shape. The solid layer 23 provided for formation of the liquid flow path can be formed depending on the shape of the liquid flow path. In this embodiment, for discharging recording liquid as small droplet from each of the two orifices corresponding to the two energy generating elements, the liquid flow path comprises two fine liquid flow paths and a common liquid chamber for supplying a recording liquid to the two fine paths.

In the present invention, the material constituting the solid layer should preferably be a positive type photosensitive material. A positive type photosensitive material has various advantages such as (i) the resolution is better than that of a negative type photosensitive material, (ii) the relief pattern has a vertical and smooth side wall surface, (iii) the relief pattern can be dissolved and removed by using a developing liquid or an organic solvent, and the like. Therefore, a positive type photosensitive material is a desirable material for forming the solid layer. The positive type photosensitive material may be either in a form of liquid or a dry film. The positive type photosensitive material in a form of a dry film is the most preferable material since a thick film of, for example, 10-100 μm can be produced and the film thickness can be easily controlled and the uniformity and handling property are excellent.

As the positive type photosensitive material, there may be used, for example, materials comprising o-naphthoquinone diazides and alkali soluble phenolic resins, and materials comprising alkali soluble resins and substances capable of finally forming phenol by photolysis of a diazonium salt, for example, benzene diazonium salts. Among them, as the positive type photosensitive dry film, there may be used, for example, a film member composed of a polyester sheet and the above-mentioned positive type photosensitive material overlying the polyester sheet such as "OZATEC R 225" (tradename, manufactured by Hoechst Japan Co.).

The solid layer can be formed with a positive type photosensitive material according to the so-called image forming process for a positive type photosensitive material.

It is optimum to use a positive type photosensitive dry film from the standpoints of processing accuracy, easy removal and processability.

Figure 10:
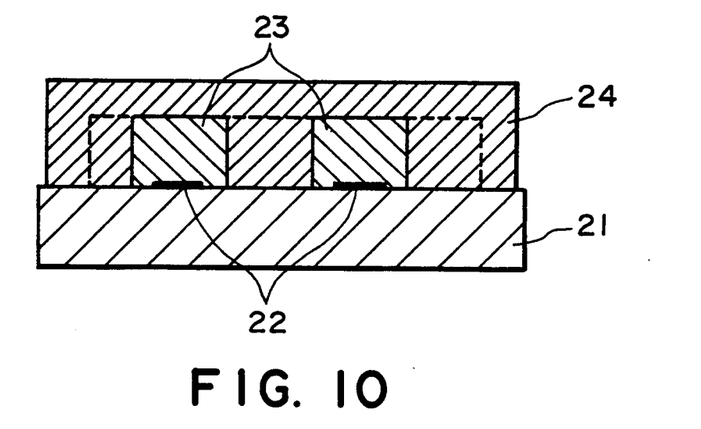
FIG. 10 is a schematic cross-sectional view, after application of a flow path wall-forming material, from the same position as in FIG. 9B.

The substrate 21 having a solid layer 23 thereon is covered with a liquid flow path wall forming material 24 composed of the active energy-ray curable resin composition according to the present invention, as shown in, e.g., FIG. 10. FIG. 10 is a schematical cross section at the position similar to that of FIG. 9B after the liquid flow path wall forming material 24 has been overlaid.

The liquid flow path wall forming material is coated in a desired thickness on a substrate by means of a known technique such as curtain coating, roll coating, spray coating and the like. It is preferable to effect coating after deaeration the material while avoiding entrainment of air-bubbles.

When, for example, a liquid flow path wall forming material 24 overlays as in FIG. 10 and the material is composed of the above-mentioned curing material, the curing material is cured under a predetermined condition in such a state that flowing-out and flowing of the liquid are suppressed and if desired, a pressing plate is placed at the upper portion.

Figure 11:
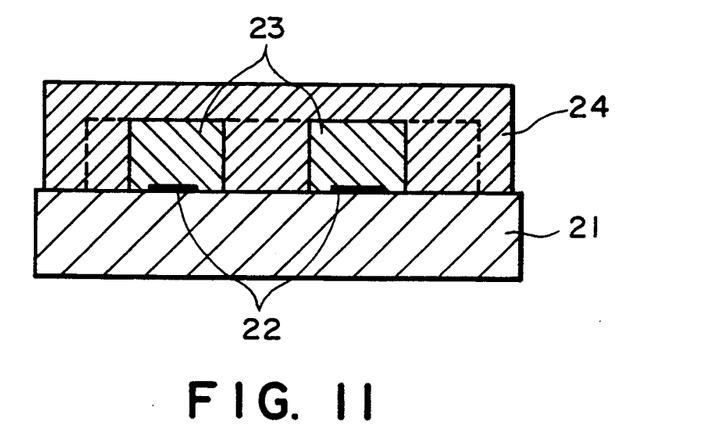
FIG. 11 is a schematic cross-sectional view, after curing when a liquid curable material is used as a flow path wall-forming material in a liquid state, from the same position as in FIG. 9B.

FIG. 11 is a schematic cross sectional view where a liquid curing material is used as the liquid flow path wall forming material and the position of the cross section is similar to that of FIG. 9B.

Where the curing condition is a room temperature or heating curing, the material is allowed to stand for 30 minutes to 2 hours. Where the curing is an ultraviolet ray curing or the like, a short time irradiation for 10 minutes or less can cure the material.

After curing, the solid layer 23 is removed from the substrate provided with the solid layer 23 and the liquid flow path wall forming material 24 to form a-liquid flow path.

Though the means for removing solid layer 23 is not critical, it is preferable, for example, to soak the substrate in a liquid capable of dissolving the solid layer 23. Upon removing the solid layer, if desired, various means for accelerating the removal such as ultrasonic treatment, spray, heating, agitation and the like may be used.

As the liquid used for the above-mentioned removing means, there can be used, for example, halogen-containing hydrocarbons, ketones, esters, aromatic hydrocarbons, ethers, alcohols, N-methylpyrrolidone, dimethylformamide, phenols, water, aqueous solution of strong alkali and the like. If necessary, surfactants may be added to the above-mentioned liquid. It is preferable to irradiate the solid layer further with a light such as ultraviolet ray and the like. It is also preferable to heat the liquid to 40°-60° C.

Figure 12:
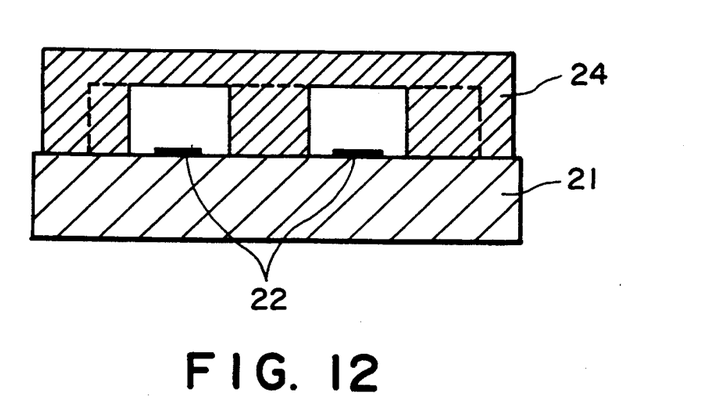
FIG. 12 is a schematic cross-sectional view after removal of a solid layer from the same position as in FIG. 9B.

FIG. 12 is a schematic cross sectional view at the position similar to that of FIG. 9B after the removal of the solid layer 23.

Figure 13:
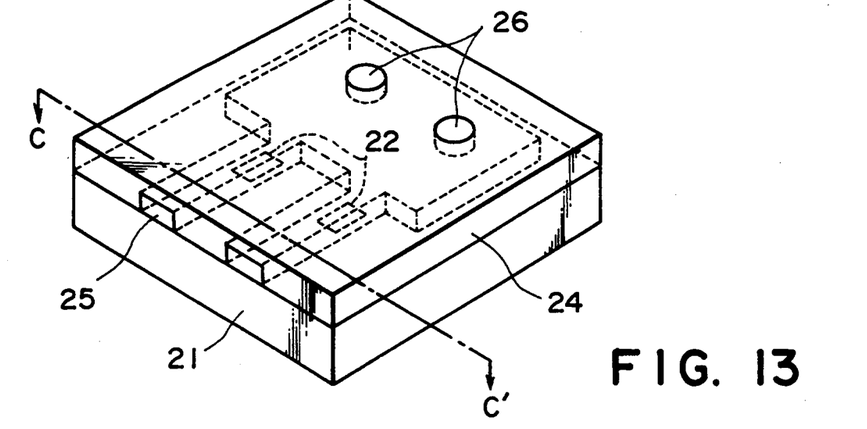
FIG. 13 is a schematic oblique view of a finished liquid jet recording head.

FIG. 13 shows an embodiment where the solid layer 23 is removed by dissolution. Liquid supplying ports 26 are formed before the solid layer is removed by dissolution, and then the solid layer is removed. FIG. 13 is a schematic oblique view of the liquid jet recording head after the removal of the solid layer.

In the embodiment as described above, the solid layer 23 is soaked in a liquid capable of dissolving the solid, and is dissolved and removed through liquid supplying ports 26. When the orifice tips are not exposed, the assembly of the substrate, the solid layer and the liquid flow path wall forming material is cut along the dot and dash line C—C' in FIG. 13 before removing by dissolution so as to expose the orifice tips.

However, such cutting of the orifice tips of the substrate assembly is not always necessary. For example, when a liquid curing material is used as a liquid flow path wall forming material and a mold is used to laminate materials such that the tip portions of orifices are not covered and the tip portions of orifices are shaped flat, the cutting is not necessary.

As described above, there are fabricated a liquid jet recording head in which desired liquid flow paths 25 are formed at desired positions of the substrate 21 provided with energy generating elements 2. If desired, after forming the liquid flow paths, cutting is effected along the line C—C' in FIG. 13. This cutting is effected so as to optimize the distance between the energy generating element 2 and the orifice, and the region to be cut may be optionally determined. If desired, the orifice tips are polished and smoothed to optimize the liquid ejection.

Figure 14:
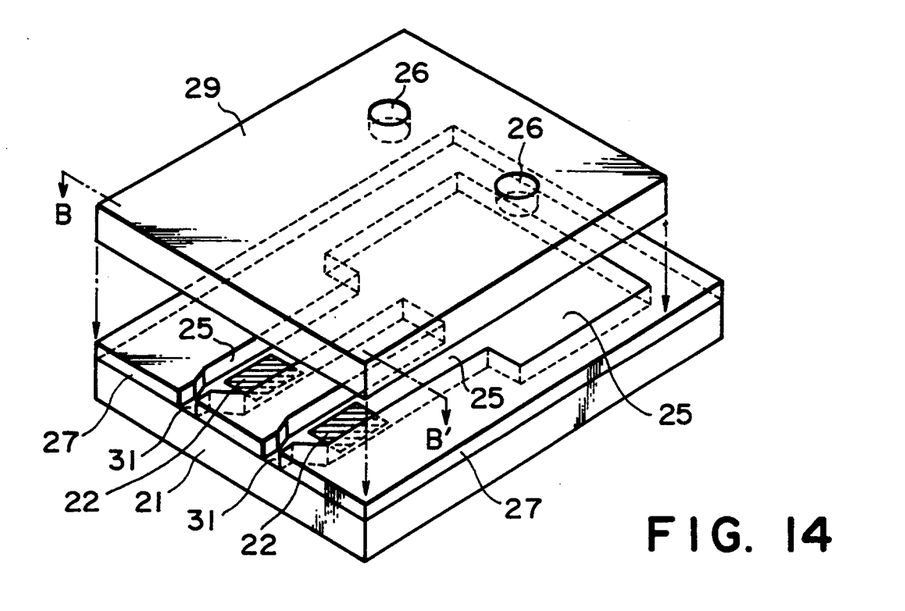
FIG. 14 is a schematic oblique view illustrating a liquid jet recording head before glueing a ceiling plate according to another embodiment of the present invention.

Further, for example, as shown in FIG. 14, after the formation of the solid layer, a liquid flow path wall forming material of a desired thickness is laminated to the solid layer and then the solid layer is removed according to the above-mentioned procedures to form only the liquid path walls 27 with the liquid flow path wall forming material. Then a desired ceiling plate 29 is adhered to the liquid flow path wall forming material to fabricate a liquid jet recording head.

FIG. 14 is a schematic oblique view of a liquid jet recording head before adhering the ceiling plate. If desired, after the formation of the liquid flow path, the head is cut along the line B—B'.

In the present embodiment, when the flow path wall 27 and the solid layer have the same height, the solid layer may be removed after or before the ceiling plate 29 is adhered. By adhering the ceiling plate 29 after removing the solid layer, the removal of the solid layer can be made more surely and it is possible to improve the production yield and productivity.

In the liquid flow path constituting member of the present invention, flow path wall 27 and ceiling plate 29 may be separated as shown in FIG. 14, or they may be integrated as shown in FIG. 13.

It is preferable to form integrally the flow path wall 27 and the ceiling plate 29 since the fabricating steps are simple. In this case, it is not particularly necessary to use an adhesive and therefore, there are not caused the disadvantages that an adhesive flows into the grooves to clog the grooves and adheres to the energy generating elements to lower the function. Further, preferable dimension accuracy can be obtained.

Figure 15:
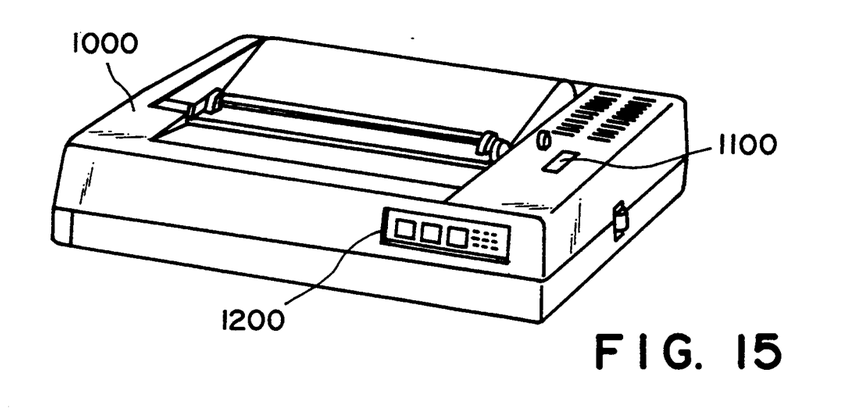
FIG. 15 is an oblique view of an ink jet apparatus provided with an ink jet head produced by a process of the present invention.

FIG. 15 is an oblique view of an ink jet apparatus provided with an ink jet head prepared by the process of the present invention. In FIG. 15, numeral 1000 represents the main body of the ink jet apparatus; numeral 1100 represents a power source switch; and numeral 1200 represents an operation panel.

The present invention brings about excellent effects particularly in a recording head, recording apparatus of the bubble jet system among the ink jet recording system.

As to its representative constitution and principle, for example, one practiced by use of the basic principle disclosed in, for example, U.S. Pat. Nos. 4,723,129 and 4,740,796 is preferred. This system is applicable to either of the so called on-demand type and the continuous type. Particularly, the case of the on-demand type is effective because, by applying at least one driving signal which gives rapid temperature elevation exceeding nucleus boiling corresponding to the recording information on an electro-thermal transducer arranged corresponding to the sheets or liquid paths holding liquid (ink), heat energy is generated at the electro-thermal transducer to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination constitutions of discharging opening liquid path, electro-thermal transducer (linear liquid path or right angle liquid path) as disclosed in the above-mentioned respective specifications, the constitution by use of U.S. Pat. Nos. 4,558,333 and 4,459,600 disclosing the constitution having the heat acting portion arranged in the flexed region is also included in the present invention. In addition, the present invention can be also effectively made the constitution as disclosed in Japanese Patent Laid-Open Application No. 59-123670 which discloses the constitution using a slit common to a plurality of electro-thermal transducer as the discharging portion of the electro-thermal transducer or Japanese Patent Laid-Open Application No. 59-138461 which discloses the constitution having the opening for absorbing pressure wave of heat energy correspondent to the discharging portion.

Further, as the recording head of the full line type having a length corresponding to the maximum width of recording medium which can be recorded by the recording apparatus, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main of the apparatus by being mounted on the main body of the apparatus or for the case by use of a recording head of the cartridge type provided integrally on the recording head itself.

Also, addition of a restoration means for the recording head, a preliminary auxiliary means, etc. provided as the constitution of the recording apparatus of the present invention is preferable, because the effect of the present invention can be further stabilized. Specific examples of these may include, for the recording head, capping means, cleaning means, pressurization or aspiration means, electro-thermal transducer or another heating element or preliminary heating means according to a combination of these, and it is also effective for performing stable recording to perform preliminary mode which performs discharging separate from recording.

Further, as the recording mode of the recording apparatus, the present invention is extremely effective for not only the recording mode only of a primary stream color such as black, etc., but also an apparatus equipped with at least one of plural different colors or full color by color mixing, whether the recording head may be either integrally constituted or combined in plural number.

In the examples of the present invention as set forth above, the use of liquid ink is discussed but any ink which is solid or softened at room temperature may also be used in the present invention. In the ink jet recording apparatus as described above it is a common practice to control the temperature of ink itself within a range of 30° to 70° C., thus adjusting the viscosity of the ink to be within the stable ejection range. Accordingly any ink which is liquid upon applying a recording signal may be used. Furthermore, any ink which is liquefied upon application of thermal energy may also be used in the present invention. Such a type of inks include, for example, one which upon application of thermal energy depending on recording signal, is liquefied to be ejected in the form of ink droplet and one which is being solidified at the time of arriving at a recording medium. Such a type of inks are used for the purpose of, for example, positively utilizing thermal energy as the energy for phase change of ink from solid to liquid to prevent temperature elevation due to thermal energy or using an ink which is solidified when left to stand to prevent evaporation of ink. When such an ink is to be used, the ink may be held in the form of liquid or solid in recessed portions or through holes of a porous sheet while facing the electrothermal transducer as shown in, for example, Japanese Laid Open Patent Application Nos. 54-6847 and 60-71260. In the present invention, the most useful system for use of the inks as described above is the system effecting film boiling as mentioned above.

As described above, the resin composition of the present invention is not compatible with nor swollen by other materials such as a pattern material brought into contact in formation of an ink jet flow path at all, and can be used to form an ink jet flow path with high precision and in high density, exhibiting less interaction with ink liquid and excellent chemical resistance, and being not readily peelable. Thus the resin composition of the present invention is greatly useful for formation of ink jet flow paths.

What is claimed is:

1. A process for preparing an ink jet head, comprising the steps of:
   (a) forming a solid layer from a positive-type photosensitive resin at a position for forming a flow path communicating with an ejection opening for ejecting ink on a substrate, said substrate being provided with an energy generating member for generating energy to be utilized for ejecting ink from the ejection opening so as to correspond to the path;
   (b) applying, at another position on the substrate where the solid layer is not formed, an active energy-ray-curable resin composition which is cationic-polymerizable comprising
      (i) 65 to 98.5% by weight of an aromatic epoxy resin having a molecular weight of not less than 300,
      (ii) 1 to 10% by weight of a epoxy-functional silane coupling agent substantially free of amino, and thiol functional groups, and
      (iii) 0.5 to 5% by weight of a photosensitized cationic polymerization initiator;
   (c) curing the active energy-ray-curable resin composition by exposure to an active energy ray; and
   (d) removing the solid layer to form the flow path.

2. The process for producing an ink jet head of claim 1, wherein the aromatic epoxy resin has at least two epoxy groups, and has no nitrogen atom.

3. The process for producing an ink jet head of claim 1, wherein the photosensitized cationic polymerization initiator is one or more compounds selected from the group consisting of aromatic onium salts, iron-arena complex, silanolaluminum complex, sulfonic acid ester dialkyl-4-hydroxyphenylsulfonium salts and dialkylphenacylsulfonium salts.

4. The process for producing an ink jet head of claim 1, wherein the composition has a static viscosity at 25° C. of from 1,000 cps to 100,000 cps.

5. The process for producing an ink jet head of claim 1, wherein the energy generating member is an electrothermal transducer for generating heat energy as the energy.

6. The process for producing an ink jet head of claim 1, wherein the energy generating member is a piezoelectric element.

7. An ink jet head produced by a process comprising the steps of:
   (a) forming a solid layer from a positive-type photosensitive resin at a position for forming a flow path communicating with an ejection opening for ejecting ink on a substrate, said substrate being provided with an energy generating member for generating energy to be utilized for ejecting ink from the ejection opening so as to correspond to the path;
   (b) applying, at another position on the substrate where the solid layer is not formed, an active energy-ray-curable resin composition which is cationic-polymerizable comprising
      (i) 65 to 98.5% by weight of an aromatic epoxy resin having a molecular weight of not less than 300,
      (ii) 1 to 10% by weight of a epoxy-functional silane coupling agent substantially free of amino and thiol functional groups, and
      (iii) 0.5 to 5% by weight of an a photosensitized cationic polymerization initiator;
   (c) curing the active energy-ray-curable resin composition by exposure to an active energy ray; and
   (d) removing the solid layer to form the flow path.

8. An ink jet apparatus comprising an ink jet head and a power source switch, wherein said ink jet head is produced by the process comprising the steps of:
   (a) forming a solid layer from a positive-type photosensitive resin at a position for forming a flow path communicating with an ejection opening for ejecting ink on a substrate, said substrate being provided with an energy generating member for generating energy to be utilized for ejecting ink from the ejection opening so as to correspond to the path;
   (b) applying, at another position on the substrate where the solid layer is not formed, an active energy-ray-curable resin composition which is cationic-polymerizable comprising
      (i) 65 to 98.5% by weight of an aromatic epoxy resin having a molecular weight of not less than 300,
      (ii) 1 to 10% by weight of a epoxy-functional silane coupling agent substantially free of amino, and thiol functional groups, and
      (iii) 0.5 to 5% by weight of a photosensitized cationic polymerization initiator;
   (c) curing the active energy-ray-curable resin composition by exposure to an active energy ray; and
   (d) removing the solid layer to form the flow path.

9. A process of using an active energy-ray-curable resin composition which is cationic polymerization, said composition comprising:
   (i) 65 to 98.5% by weight of an aromatic epoxy resin having a molecular weight of not less than 300,
   (ii) 1 to 10% by weight of a epoxy-functional silane coupling agent substantially free of amino and thiol functional groups, and
   (iii) 0.5 to 5% by weight of a photosensitized cationic polymerization initiator;
to prepare an ink jet head, said process comprising the steps of:
   (a) forming a solid layer from a positive-type photosensitive resin at a position for forming a flow path communicating with an ejection opening for ejecting ink on a substrate, said substrate being provided with an energy generating member for generating energy to be utilized for ejecting ink from the ejection opening so as to correspond to the path;
   (b) applying, at another position on the substrate where the solid layer is not formed, said active energy-ray-curable resin composition;
   (c) curing said active energy-ray-curable resin composition by exposure to an active energy ray; and
   (d) removing the solid layer to form the flow path.

* * * * *

UNITED STATES PATENT AND TRADEMARK OFFICE
CERTIFICATE OF CORRECTION

PATENT NO. : 5,335,004
DATED : August 2, 1994
INVENTOR(S) : HIROHIDE MATSUHISA

It is certified that error appears in the above-identified patent and that said Letters Patent is hereby corrected as shown below:

ON TITLE PAGE

In [56] References Cited, under FOREIGN PATENT DOCUMENTS:
"58348  10/1967  Fed. Rep. of Germany" should read
--58348  10/1967  Dem. Rep. of Germany--;
"151611  7/1978  United Kingdom" should read
--1516511  7/1978  United Kingdom--.

COLUMN 1

Line 40, "figures." should read --Figures.--.

COLUMN 2

Line 8, "face" should read --faces--.
Line 20, "an" should read --a--.
Line 39, "Br nsted" should read --Brönsted--.

COLUMN 5

Line 10, "is" should read --are--.

COLUMN 6

Line 34, "Br nsted" should read --Brönsted--.
Line 38, "No. 3,981,895" should read --No. 3,981,897--.
Line 40, "Patent 828,650" should read --Patent 828,670--.
Line 43, "2875" should read --2877--.

UNITED STATES PATENT AND TRADEMARK OFFICE
CERTIFICATE OF CORRECTION

PATENT NO. : 5,335,004
DATED : August 2, 1994
INVENTOR(S) : HIROHIDE MATSUHISA

Page 2 of 3

It is certified that error appears in the above-identified patent and that said Letters Patent is hereby corrected as shown below:

COLUMN 8

Line 30, "polymeriation" should read --polymerization--.
Line 55, "a" should read --an--.
Line 58, "diethyleneglycol/" should read --diethylene glycol/--.

COLUMN 9

EXAMPLE 3, "polymeriation" should read --polymerization--.

COLUMN 10

Line 51, "Tedlet®" should read --Tedler®--.

COLUMN 11

TABLE 1, "Gellation" should read --Gelation--.
Line 21, "Giving" should read --giving--.

COLUMN 12

Line 25, "material" should read --material or--.
Line 27, "acts" should read --or acts--.
Line 62, "well" should read --wall--.

COLUMN 13

Line 1, "droplet" should read --droplets--.
Line 54, "deaeration" should read --deaeration of--.

UNITED STATES PATENT AND TRADEMARK OFFICE
CERTIFICATE OF CORRECTION

PATENT NO. : 5,335,004
DATED : August 2, 1994
INVENTOR(S) : HIROHIDE MATSUHISA

It is certified that error appears in the above-identified patent and that said Letters Patent is hereby corrected as shown below:

COLUMN 17

Line 7, "Nos. 54-6847" should read --Nos. 54-56847--.
    Line 22, "preparing" should read --producing--.
    Line 37, "a" should read --an--.
    Line 38, "amino," should read --amino--.
    Line 50, "iron-arena" should read --iron-arene--.
    Line 51, "silanolaluminum" should read --silanol-aluminum--.

COLUMN 18

Line 11, "a" should read --an--.
    Line 14, "an" should be deleted.
    Line 36, "a" should read --an--.
    Line 37, "amino," should read --amino--.
    Line 44, "polymerization," should read --polymerizable,--.
    Line 48, "a" should read --an--.

Signed and Sealed this

Eleventh Day of April, 1995

Attest:

BRUCE LEHMAN

Attesting Officer      Commissioner of Patents and Trademarks